US011674055B2

(12) United States Patent
Brinkhuis et al.

(10) Patent No.: US 11,674,055 B2
(45) Date of Patent: *Jun. 13, 2023

(54) RMA CROSSLINKABLE COMPOSITIONS AND RMA CROSSLINKABLE RESINS FOR EASY TO CLEAN COATINGS

(71) Applicant: ALLNEX NETHERLANDS B.V., Bergen Op Zoom (NL)

(72) Inventors: Richard Hendrikus Gerrit Brinkhuis, Zwolle (NL); Michael Anthony Gessner, La Grange, KY (US); Dirk Emiel Paula Mestach, Nijlen (BE); Ramesh Subramanian, Louisville, KY (US); William Jay Degooyer, Louisville, KY (US); Ajaya Nanda, Louisville, KY (US); Eric Matthew McCracken, Louisville, KY (US); Francesca Fallani, Dordrecht (NL); Monique Alexina Mballa Mballa, Wageningen (NL); Martin Bosma, Arnhem (NL)

(73) Assignee: ALLNEX NETHERLANDS B.V., Bergen Op Zoom (NL)

( * ) Notice: Subject to any disclaimer, the term of this patent is extended or adjusted under 35 U.S.C. 154(b) by 249 days.

This patent is subject to a terminal disclaimer.

(21) Appl. No.: 17/133,863

(22) Filed: Dec. 24, 2020

(65) Prior Publication Data
US 2021/0115292 A1     Apr. 22, 2021

Related U.S. Application Data

(62) Division of application No. 15/563,956, filed as application No. PCT/EP2016/058588 on Apr. 18, 2016, now Pat. No. 10,920,101.

(60) Provisional application No. 62/148,981, filed on Apr. 17, 2015.

(30) Foreign Application Priority Data

May 28, 2015   (EP) .................................... 15169719

(51) Int. Cl.
*C09D 167/08* (2006.01)
*C08J 3/24* (2006.01)
*C09D 5/00* (2006.01)
*C08F 8/00* (2006.01)
*C08L 67/08* (2006.01)
*B05D 3/06* (2006.01)
*C08G 63/91* (2006.01)

(52) U.S. Cl.
CPC .......... *C09D 167/08* (2013.01); *B05D 3/067* (2013.01); *C08F 8/00* (2013.01); *C08G 63/914* (2013.01); *C08J 3/24* (2013.01); *C08L 67/08* (2013.01); *C09D 5/00* (2013.01); *C08J 2367/08* (2013.01)

(58) Field of Classification Search
CPC .................................................... C09D 167/08
USPC ........................................................ 524/601
See application file for complete search history.

(56) References Cited

U.S. PATENT DOCUMENTS

| | | |
|---|---|---|
| 2,635,100 A | 4/1953 | Werntz |
| 2,759,913 A | 8/1956 | Hulse et al. |
| 4,217,396 A | 8/1980 | Heckles |
| 4,223,072 A | 9/1980 | Baney et al. |
| 4,408,018 A | 10/1983 | Bartman et al. |
| 4,529,487 A | 7/1985 | Hsu et al. |
| 4,602,061 A | 7/1986 | Akkerman |
| 4,749,728 A | 6/1988 | Craun et al. |
| 4,851,294 A | 7/1989 | Buter et al. |
| 4,871,822 A | 10/1989 | Brindöpke et al. |
| 4,938,980 A | 7/1990 | Arciszewski et al. |
| 5,017,649 A | 5/1991 | Clemens |
| 5,039,720 A | 8/1991 | Saatweber et al. |
| 5,084,536 A | 1/1992 | Brindöpke et al. |
| 5,959,028 A | 9/1999 | Brinkhuis |
| 5,973,082 A | 10/1999 | Elmore |
| 5,990,224 A | 11/1999 | Raynolds et al. |
| 6,201,048 B1 | 3/2001 | Raynolds et al. |

(Continued)

FOREIGN PATENT DOCUMENTS

| | | |
|---|---|---|
| CN | 86101015 A | 8/1986 |
| CN | 1309683 A | 8/2001 |

(Continued)

OTHER PUBLICATIONS

Azo Materials, "A_Guide_to_Silane_Solutions_Adhesives", Sep. 7, 2012, Internet Article, https://www.azom.com/article.aspx?ArticleID=6777.

(Continued)

*Primary Examiner* — Jane L Stanley
(74) *Attorney, Agent, or Firm* — Hoyng Rokh Monegier B.V.; David P. Owen

(57) ABSTRACT

The invention relates to RMA crosslinkable coating composition, a method for the preparation thereof and a resulting coating having easy to clean properties useful in applications like graffiti resistant, sanitisable coatings and in flooring, said composition comprising RMA crosslinkable component with at least 2 RMA donor groups and at least 2 RMA acceptor groups characterized by having fatty components selected from the group of fatty acids, fatty alcohols, fatty amines, fatty thiols and dimeric fatty acid in an amount represented by an Oil Content OC between 0, preferably 4 and 40 wt %, and crosslinking density XLD of at least 1.4 a glass transition Tg of at least 290 in combination providing a easy to clean value ΔE less than 20. The invention also relates to RMA crosslinkable fatty resins for use in RMA crosslinkable top coatings.

21 Claims, No Drawings

(56) References Cited

U.S. PATENT DOCUMENTS

| | | | |
|---|---|---|---|
| 6,262,169 B1 | 7/2001 | Helmer et al. |
| 6,265,029 B1 | 7/2001 | Lewis |
| 6,706,414 B1 | 3/2004 | Dammann et al. |
| 6,878,845 B2 | 4/2005 | Sheridan |
| 6,989,459 B2 | 1/2006 | Walker |
| 7,524,435 B2 | 4/2009 | Bernhard |
| 7,851,530 B2 | 12/2010 | Brinkhuis et al. |
| 8,013,068 B2 | 9/2011 | Beckley et al. |
| 8,124,688 B2 | 2/2012 | Meijer et al. |
| 8,569,440 B2 | 10/2013 | Spyrou et al. |
| 8,829,151 B2 | 9/2014 | Meijer et al. |
| 8,962,725 B2 | 2/2015 | Brinkhuis et al. |
| 9,181,452 B2 | 11/2015 | Brinkhuis |
| 9,181,453 B2 | 11/2015 | Brinkhuis |
| 9,260,626 B2 | 2/2016 | Brinkhuis |
| 9,284,423 B2 | 3/2016 | Brinkhuis |
| 9,534,081 B2 | 1/2017 | Brinkhuis |
| 9,587,138 B2 | 3/2017 | Brinkhuis et al. |
| 9,834,701 B2 | 12/2017 | Brinkhuis et al. |
| 2003/0023108 A1 | 1/2003 | E. Walker |
| 2003/0195305 A1 | 10/2003 | Kuo et al. |
| 2004/0072979 A1 | 4/2004 | Sheridan et al. |
| 2005/0137275 A1 | 6/2005 | Nefzger et al. |
| 2005/0143575 A1 | 6/2005 | Bernard |
| 2006/0078742 A1 | 4/2006 | Kauffman et al. |
| 2009/0143528 A1 | 6/2009 | Mestach et al. |
| 2009/0226729 A1 | 9/2009 | Niimoto et al. |
| 2011/0003937 A1 | 1/2011 | Kontani |
| 2011/0251338 A1 | 10/2011 | Kim et al. |
| 2013/0053505 A1 | 2/2013 | Brinkhuis et al. |
| 2013/0210986 A1 | 8/2013 | Brinkhuis et al. |
| 2013/0317156 A1 | 11/2013 | Yu |
| 2014/0088233 A1 | 3/2014 | Kann |
| 2014/0221542 A1 | 8/2014 | Brinkhuis et al. |
| 2014/0228507 A1 | 8/2014 | Brinkhuis et al. |
| 2016/0115344 A1 | 4/2016 | Brinkhuis et al. |

FOREIGN PATENT DOCUMENTS

| | | |
|---|---|---|
| CN | 1637031 A | 7/2005 |
| CN | 1723242 A | 1/2006 |
| CN | 1757656 A | 4/2006 |
| CN | 1816597 A | 8/2006 |
| CN | 1910234 A | 2/2007 |
| CN | 1964997 A | 5/2007 |
| CN | 1976972 A | 6/2007 |
| CN | 101012291 A | 7/2007 |
| CN | 101103060 A | 1/2008 |
| CN | 101107289 A | 1/2008 |
| CN | 101213230 A | 7/2008 |
| CN | 101268149 A | 9/2008 |
| CN | 101869844 A | 10/2010 |
| CN | 101879457 A | 11/2010 |
| CN | 102834436 A | 12/2012 |
| CN | 102834437 A | 12/2012 |
| CN | 103562328 A | 2/2014 |
| CN | 103974999 A | 8/2014 |
| DE | 835809 A | 4/1952 |
| DE | 3041223 A1 | 5/1981 |
| EP | 0192304 A1 | 8/1986 |
| EP | 0198519 A1 | 10/1986 |
| EP | 0227454 A2 | 7/1987 |
| EP | 227454 A2 | 7/1987 |
| EP | 0161697 B1 | 3/1988 |
| EP | 0310011 A1 | 9/1988 |
| EP | 0326723 A1 | 8/1989 |
| EP | 0448154 A1 | 9/1991 |
| EP | 0501223 A2 | 9/1992 |
| EP | 0651023 A2 | 5/1995 |
| EP | 0808860 A2 | 11/1997 |
| EP | 1541606 A1 | 12/2004 |
| EP | 1593727 A1 | 11/2005 |
| EP | 1761582 | 1/2006 |
| EP | 1513900 B1 | 2/2006 |
| EP | 1640388 A2 | 3/2006 |
| EP | 1838747 | 7/2006 |
| EP | 2072520 A1 | 6/2009 |
| EP | 1813630 81 | 3/2010 |
| EP | 2374836 A2 | 4/2010 |
| EP | 1641887 B1 | 10/2010 |
| EP | 1902081 B1 | 12/2010 |
| EP | 2374836 A1 | 10/2011 |
| EP | 1641888 B1 | 2/2012 |
| EP | 2556108 B1 | 7/2014 |
| EP | 2764035 A1 | 8/2014 |
| EP | 3085748 A1 | 10/2016 |
| GB | 1596638 A | 8/1981 |
| GB | 2093472 A | 9/1982 |
| GB | 2010879 A | 7/1997 |
| GB | 2405149 A | 2/2005 |
| JP | 53141369 A | 12/1978 |
| JP | H01121376 A | 5/1986 |
| JP | 62-223204 A | 10/1987 |
| JP | 01204919 A | 8/1989 |
| JP | 8501124 A | 2/1996 |
| JP | 8319437 A | 12/1996 |
| JP | H1045993 A | 2/1998 |
| JP | 10330690 A | 12/1998 |
| JP | 2000119353 A | 4/2000 |
| JP | 2001505948 A | 5/2001 |
| JP | 2001-207631 A | 8/2001 |
| JP | 2001516787 A | 10/2001 |
| JP | 2001516789 A | 10/2001 |
| JP | 2002514673 A | 5/2002 |
| JP | 2002285100 | 10/2002 |
| JP | 2003522817 A | 7/2003 |
| JP | 2004018859 A | 1/2004 |
| JP | 2004211090 A | 7/2004 |
| JP | 2005-034687 A | 2/2005 |
| JP | 2005-505653 A | 2/2005 |
| JP | 2006-089743 A | 4/2006 |
| JP | 2006525402 A | 11/2006 |
| JP | 2011-099744 A | 5/2011 |
| JP | 2011-208371 A | 10/2011 |
| JP | 2012505926 A | 3/2012 |
| JP | 2013-091982 A | 5/2013 |
| JP | 2013-108339 A | 6/2013 |
| JP | 2013528670 A | 7/2013 |
| JP | 2014533948 A | 12/2014 |
| JP | 2015120769 A | 7/2015 |
| JP | 5910952 B2 | 4/2016 |
| KR | 100232793 31 | 12/1999 |
| NL | 8203502 A | 4/1984 |
| RU | 2275403 C2 | 4/2006 |
| RU | 2346016 C2 | 2/2009 |
| RU | 2415167 C2 | 3/2011 |
| RU | 2484113 C2 | 6/2013 |
| RU | 2532909 C2 | 11/2014 |
| SG | 11201401321 W | 4/2013 |
| TW | 200613500 A | 5/2006 |
| WO | 94017148 A | 8/1994 |
| WO | 9641833 A1 | 12/1996 |
| WO | 9825989 A1 | 6/1998 |
| WO | 9914275 A1 | 3/1999 |
| WO | 9914278 A1 | 3/1999 |
| WO | 9914279 A1 | 3/1999 |
| WO | 9958608 A1 | 11/1999 |
| WO | 0004106 A1 | 1/2000 |
| WO | 0112708 A1 | 2/2001 |
| WO | 02053613 A1 | 7/2002 |
| WO | 2003031502 A | 4/2003 |
| WO | 03089479 A2 | 10/2003 |
| WO | 2004035632 A2 | 4/2004 |
| WO | 2004099329 A1 | 11/2004 |
| WO | 2005048866 A2 | 6/2005 |
| WO | 2005104694 A2 | 11/2005 |
| WO | 2006003044 A1 | 1/2006 |
| WO | 2006074895 A1 | 7/2006 |
| WO | 2006075000 A1 | 7/2006 |
| WO | 2006081079 | 8/2006 |
| WO | 2006081079 A1 | 8/2006 |
| WO | 2007000335 A1 | 1/2007 |
| WO | 2007002328 A1 | 1/2007 |
| WO | 2007035255 A1 | 3/2007 |

(56) References Cited

FOREIGN PATENT DOCUMENTS

| WO | 2008070022 A1 | 6/2008 |
| WO | 2008157468 A1 | 12/2008 |
| WO | 2010046240 A1 | 4/2010 |
| WO | 2011124663 A1 | 10/2011 |
| WO | 2011124664 A1 | 10/2011 |
| WO | 2011124665 A1 | 10/2011 |
| WO | 2012002095 A | 1/2012 |
| WO | 2012175622 A1 | 12/2012 |
| WO | 2013050574 A1 | 4/2013 |
| WO | 2013050622 A1 | 4/2013 |
| WO | 2013050623 A1 | 4/2013 |
| WO | 2013071012 A2 | 5/2013 |
| WO | 2014125589 A | 8/2014 |
| WO | 2005021672 A1 | 10/2014 |
| WO | 2014166880 A1 | 10/2014 |
| WO | 2016054367 A1 | 4/2016 |
| WO | 2016166334 A1 | 10/2016 |
| WO | 2016166361 A1 | 10/2016 |
| WO | 2016166365 A1 | 10/2016 |
| WO | 2016166369 A1 | 10/2016 |
| WO | 2016166371 A1 | 10/2016 |
| WO | 2016166381 A1 | 10/2016 |
| WO | 2016166382 A1 | 10/2016 |
| WO | 2019145472 A1 | 8/2019 |

OTHER PUBLICATIONS

Brinkhuis, R.; Schutyser, J.; Thys, F.; De Wolf, E.; Buser, T.; Kalis, J.; Magnus, N.; Van Wijk, F. Taming the Michael Addition Reaction. European Coatings Journal 2015, 34-40. (Year: 2015).
T. Jung et al.—Farbe und Lacke Oct. 2003.
The International Search Report of PCT/EP2012/069904.
Braun, D. et al., Polymer Synthesis: Theory and Practice, 4th ed., 2005, pp. 64-66.
Noomen, Arie: "Applications of Michael addition chemistry in coatings technology", Progress in Organic Coatings, 32 (1997), pp. 137-142.
Krishnadas, Shashikiran et al., "Rapid Setting Epoxy Primer System with the Addition of Blocked Catalyst", Indian Journal of Advances in Chemical Science 2 (2014), pp. 55-60.
Lösungen, Römpp online 4.0, Mar. 1, 2002.
"The Basics of Airless Spraying, Information on Basic Components, Spray Techniques and Safety", 2014.
"ETPPAAc Solutions Ethyltriphenylphosphonium Acid Acetate", Apr. 20, 2007, pp. 1-2.

RMA CROSSLINKABLE COMPOSITIONS AND RMA CROSSLINKABLE RESINS FOR EASY TO CLEAN COATINGS

BACKGROUND OF THE INVENTION

The invention relates to RMA crosslinkable coating composition, a method for the preparation thereof and a resulting coating having easy to clean properties useful in applications for its appearance advantages but also for purposes like graffiti resistant, sanitisable coatings and in flooring, said composition comprising RMA crosslinkable component with at least 2 RMA donor groups and at least 2 RMA acceptor groups. The invention also relates to RMA crosslinkable fatty resins for use in RMA crosslinkable top coatings.

A variety of different types of resins are known in the prior art that can form the binder of a coating composition. The dominant technologies that are currently being used are epoxy-amine and polyol-polyisocyanate. Although these resin systems have their merits, they also pose some important limitations as the use chemicals that have toxicological profiles that are questionable (bisphenol A/F in epoxy resins, amine curing agents, monomeric diisocyanate in polyisocyanate hardeners). A further disadvantage of polyol-polyisocyanate coating systems is that, during the application, they are moisture sensitive. Epoxy-amine coating systems have a further disadvantage that they cannot be cured at relatively low temperatures below 15 or 10° C. which may often occur in outdoor applications. Consequently, there is a desire for a coating composition that has a more favorable toxicological profile, can be cured also at low temperatures and also in moist conditions.

Another important parameter for coating applications is the working time. This is the time following mixing of the basic ingredients during which the coating can be applied and finished without detrimental effect on its properties such as adhesion, compaction and surface finish. This property is very much linked to the consistency of the resin. Epoxy-amine and polyol-polyisocyanate systems will start reacting chemically already in the liquid state directly after mixing. This implies that the viscosity of the mixed liquid resin will start to increase, reducing the fluidity and the ability of the resin flooring to flow and level. Coating compositions having a good working time are known. For example alkyd resins have a good working time. However they take a rather long time to cure and fully develop the mechanical properties required for the end use (service time). This limits the use to relatively thin layers which harden faster than thick layers and also leaves a desire for better mechanical properties and chemical resistance of the resulting cured coating. Therefore there is still a desire for coating compositions with a more favorable balance of the counteractive requirements of working time and time to service.

Another desire is that the coating compositions have a low volatile organic content for safety, environmental and health reasons, in particular when applied in poorly ventilated circumstances, in particular indoor. This requirement is contra-active to achieving a higher fluidity and improved working time through the use of a volatile organic solvent. With volatile solvent herein is meant, unless otherwise described, the organic compounds having a boiling point below 250° C. present in the composition ready for use.

RMA crosslinkable compositions are described in EP2556108 and have reduced several of the abovementioned disadvantages. RMA crosslinkable compositions comprise at least one crosslinkable component comprising reactive components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C=C) (RMA acceptor group). In the presence of a base catalyst (C), these reactive groups react to achieve crosslinking by Real Michael Addition (RMA) reaction between said at least one crosslinkable components. A special catalyst C is described which is a substituted carbonate catalyst which decomposes in a coating layer to generate carbon dioxide which evaporates from the applied curing coating layer and a strong base which starts the RMA crosslinking reaction. This provides a very fast curing as well as a good potlife.

EP2764035 further described RMA crosslinkable composition further comprising a reactivity moderator D comprising an X—H group that is also a Michael addition donor reactable with component B under the action of catalyst C, wherein X is C, N, P, O or S. The reactivity moderator allows to moderate the RMA crosslinking reaction kinetics to increase open time without significant impact on reactivity which improves film formation and ease of handling.

However there is a continuous desire to further improve the RMA crosslinkable coating compositions in particular in view of specific end-uses. So apart from the above desired features it is desired that the coating has a good water and chemical resistance, good adhesion, a high resistance to impact and abrasion and an optically attractive surface. A particular objective of the present invention is to provide coatings that are easy to clean and low in dirt pickup.

BRIEF DESCRIPTION OF THE INVENTION

According to the invention one or more of the above mentioned problems are solved by an RMA crosslinkable coating composition having easy to clean properties comprising at least one crosslinkable component comprising reactive components A and B, each comprising at least 2 reactive groups wherein the at least 2 reactive groups of component A are acidic protons (C—H) in activated methylene or methine groups (RMA donor group), and the at least 2 reactive groups of component B are activated unsaturated groups (C=C) (RMA acceptor group), which react to achieve crosslinking by Real Michael Addition (RMA) reaction between said at least one crosslinkable components in the presence of a base catalyst (C), said crosslinkable composition is characterized in that
 a. the composition comprises fatty components selected from the group of fatty acids, fatty alcohols, fatty amines, fatty thiols and dimeric fatty acid,
 b. in an amount represented by an Oil Content OC between 0 and 40 wt %, preferably being at least 4, more preferably at least 10 or more preferably at least 14 wt % defined as the total weight of fatty components relative to the total solids weight of the crosslinkable composition, and wherein
 c. the components in the crosslinkable composition are chosen such that after curing a coating is formed having a polymer network crosslinking density XLD, not including pigment effects, of at least 1.4, preferably at least 1.6, more preferably at least 1.9, even more preferably at least 2.5, most preferably at least 3.5 mmoles/g as determined by DMTA measurement on a cured coating film, and wherein
 d. the components in the crosslinkable composition are chosen such that after curing a coating is formed having, not including pigment effects, a glass transition Tg as determined by DMTA measurement of at least 290, preferably at least 300K, more preferably at least 305 at least 310 K and 320 more preferably at least 330 K, e. and wherein OC, XLD and Tg are chosen in combination sufficiently high that the cleaning parameter ΔE is less than 20, preferably less than 15, more preferably less than 10 and most preferably less than 5 as measured by colour difference measurement before and after applying-and-cleaning of pigment as described in the description.

The inventors have found RMA crosslinkable coating compositions that on curing result in coating that are easy to clean as illustrated by experiments in the Examples. The inventors have found the parameters of the coating and of the coating composition that provide easy to clean properties in selecting an appropriately high XLD and Tg for a chosen level of OC or an appropriately high OC and XLD for a chosen level of Tg or an appropriately high Tg and OC for a chosen level of XLD wherein appropriate means an ΔE less than 20. The easy to clean properties are very important in use of RMA crosslinkable coating in flooring, in graffiti resistant coatings and in sanitizable coatings for hospital and toilet walls and floors.

It is noted that the amount OC refers to the fatty monomer building blocks, so OC is the sum of the mass of fatty components used including only the mass of the original functional group that is attached to the fatty chain, so counted as acid in case of fatty acid, alcohol (in case of fatty alcohol), thiol (in case of fatty thiol), amine (in case of fatty amine), divided by the total mass of the organic components (excluding pigments) in the coating composition that end up in the final network.

It is noted that the XLD and Tg parameters are defined based on a coating comprising the RMA crosslinkable composition but not including solid pigments or other components that influence these parameters, so it is a characteristic of the polymer network as exemplified in the many examples herein. Clearly the easy to clean coating compositions meeting those requirements can be used in formulations that do have pigments or other coating additives.

The skilled person knows how to select the polymer components to achieve higher Tg, XLD and OC. This will be explained in more detail herein. In a preferred embodiment, a. OC is 0-4 wt % and XLD is at least 3.5, preferable at least 4.5, 5.0 or even 5.5 mmoles/g and Tg is at least 330K, preferably at least 340, 350 or even 360K OR b. OC is 4-10 wt % and XLD is at least 1.9, preferable at least 2.1, 2.5 or even 3 mmoles/g and Tg is at least 300K, preferably at least 305, or even 310K c. OC is 10-14 wt % and XLD is at least 1.6, preferable at least 1.7, 1.9, 2.1 or even 2.5 mmoles/g and Tg is at least 300K, preferably at least 305, or even 310K d. OC is at least 15 wt % and XLD is at least 1.4, preferable at least 1.5, 1.7, 1.9 or even 2.1 mmoles/g; and Tg is at least 290K, preferably at least 295, 300 or even 305K The skilled person an without undue burden adapt the composition to achieve easy to clean properties. Even at OC=0 it can be achieved but at extreme high XLD and Tg, but the strict Tg and XLD requirements go down as the OC increases as indicated above.

The fatty chains in general preferably contain 8-40 carbons, preferably less than 30 or even 23 and preferably more than 8 or 10, which fatty chains may be saturated or unsaturated, optionally substituted to include epoxide or other substituents, may be branched, but are preferably linear, and preferably attached as pendant chains to larger molecules in the original crosslinking composition. Preferably the fatty chains contain at least 12 carbons in case OC is at least 15 wt % and more preferably also if OC is from 10 to 14 wt %. It was found that ETC was easier to achieve with higher chain length in particular at higher OC. More preferably, the fatty chains containing at least 12 carbons are medium or highly unsaturated. It was found that in particular at high OC crystallization of the fatty chains can occur, which can be prevented in a significant degree of unsaturation.

In the RMA crosslinkable coating composition the fatty components can be a. free unreacted fatty components or b. in a fatty adduct that does not become covalently bonded in the crosslinked network or c. preferably, chemically bonded to RMA crosslinkable fatty components, r d. pending or in-chain, preferably pending, or e. combinations thereof.

It was surprising to find that good results were obtained not only when the fattly components are part of the crosslinkable components but mainly when they are free unreacted fatty components or in a fatty adducts that does not become covalently bonded in the crosslinked network.

The fatty components in fatty adducts may comprise one fatty component reacted to a backbone or two or more fatty components reacted to a polyfunctional backbone, preferably fatty acid on a polyol, fatty alcohol or fatty amine on a polyacid, more preferably fatty acid polyglycerol, neopentylglycol.

It is preferred that the fatty adducts not have too high molecular weight, preferably having a molecular weight (Mn) between 150 and 15000 dalton, preferably 200 and 10000 dalton, more preferably 200 and 5000 dalton.

In another embodiment, the fatty components are bonded in RMA crosslinkable fatty components, preferably RMA crosslinkable fatty resins.

A RMA crosslinkable fatty resin may contain one or more fatty components, preferably acids and at least 2 reactive groups which are acidic protons (C—H) in activated methylene or methine groups wherein the activated C—H reactive groups are in one or more reactive components A having a structure according to formula 1:

Formula 1

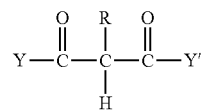

wherein R is hydrogen or an alkyl or aryl and Y and Y' are identical or different substituent groups, preferably alkyl, aralkyl or aryl (R*), or alkoxy (—OR*) or wherein the —C(=O)—Y and/or —C(=O)—Y' is replaced by CN or aryl, preferably by no more than one phenyl.

The inventors have found that the RMA crosslinkable fatty resin of the invention has very favorable properties in coating applications, in particular in RMA crosslinkable compositions. RMA crosslinkable compositions were found to have very good properties for use in in highly demanding coating applications as for example in synthetic flooring and floor coating applications.

The RMA crosslinkable compositions comprising the resin of the invention compositions have a very good balance of working time and service time and also have improved coating properties like adhesion and appearance. It is believed that the fatty acid backbone helps the RMA crosslinkable composition, to penetrate into porous substrates to seal them better and also to bring out better the vibrancy of colors of the substrate in un-pigmented coatings. It was further found that the RMA crosslinkable compositions comprising the resin of the invention have good adhesion and have very useful easy to clean properties.

In view of adhesion it is preferred that these resin have a relatively high OH value, preferably at least 50, more preferably at least 80, most preferably at least 100. It was surprisingly found that good crosslinking reactivity could be achieved at such higher OH values but preferably the OHV should be less than 250 preferably lower than 200 or 150 mg KOH/g.

The one or more reactive components A preferably predominantly comprise one type of reactive components, predominantly meaning that more than 50, 75, 90 and most preferably 100% of the C—H reactive groups in the crosslinkable component A are from one type of reactive component A and reactive component A preferably is a malonate, acetoacetate, acetylacetone, acetoacetamide or propionylacetate, most preferably a malonate The resin of the invention preferably is 1) a polyol oligomer or polymer modified with fatty components, preferably fatty acids and reactive component A or fatty acid oil modified with reactive component A or 2) a polyester, polyurethane, acrylic, epoxy or polyether oligomer or polymer or hybrids thereof including polyesterurethanes or polyesteramides or mixtures thereof, which are modified with fatty acids and reactive component A and wherein the fatty acids and reactive component A are preferably bonded with ester bonds or 3) wherein the resin is an oligomer or polymer polyester, polyurethane, polyether, acrylic, epoxy, or polyol comprising hydroxyl groups and fatty acids, preferably an alkyd comprising saturated or unsaturated fatty acids which is modified with reactive component A, preferably by esterification or trans-esterification.

In general the fatty components have a carbon length from 8-28, preferably from C10 to C22 and are preferably derived from bio-based sources, preferably vegetable oil. In a particular embodiment the fatty acids comprise a C8, preferably C10 to C18 chain with less than 20, 15 or 10 wt % of the fatty acids being unsaturated fatty acids.

In another embodiment the fatty resin of the invention comprises fatty acids comprising C8 to C18 chains with 20, 25, 30 or 40 to 99 wt %, preferably 60 to 99 wt % of the fatty acids being unsaturated fatty acids. This resin has oxidative cure properties, typically in combination with drier salt, and can be cured by RMA reaction as well as by reaction with the unsaturated bonds, for example by auto-oxidative or to some extent in actinic radiation crosslinking.

The RMA crosslinkable fatty resin itself comprises fatty compounds, preferably fatty acids preferably in an amount of 5 to 80 wt %, preferably 10 to 60 wt % and most preferably 20 to 40 wt % relative to total weight of the RMA crosslinkable resin and comprises reactive components A in an amount between 1 and 80 wt %, preferably 5 to 70 wt % more preferably 10 to 40 wt % relative to total weight of the RMA crosslinkable resin. The amount of Fatty compound in the fatty resin is chosen in view of the total OC of the RMA crosslinkable composition in view of the ETC properties. Similarly, the amount of reactive components A is chosen in view of the XLD in view of the ETC properties. The amount of not crosslinkable free unreacted fatty components or fatty adducts that does not become covalently bonded in the crosslinked network can range between 0 and 100 wt % of the sum of all fatty compounds containing components, but preferably is 10-95 wt %.

It is noted that the fatty compounds can be entirely or for a majority in a form that is not and cannot not bond to the RMA crosslinked polymer network. Therefore the RMA crosslinkable polymer used in the coating composition can also be entirely without fatty compounds or a mixture thereof with a fatty resin. Also in that case this RMA crosslinkable components type and amount of reactive components A and B are to be chosen in view of the XLD to be achieved.

An advantage of the RMA crosslinkable fatty RMA resin is also that it can be for a large part based on renewable resources. The fatty acids are preferably derived from bio-based resources, preferably vegetable oil. In a preferred embodiments the resin is based on alkyd which may have other bio-based components in particular polyols like glycerol. Ideally the resin may contain at least 30, preferably 40 or 50 wt % of the resin weight of components derived from renewable resources.

The RMA crosslinkable fatty resin preferably has a weight average molecular weight Mw of at least 250 daltons and preferably is a polymer having Mw between 250 and 10000, more preferably between 400 and 5000 daltons, The RMA crosslinkable fatty resin must have an acid value below 5, preferably below 4, 3, 2 and most preferably below 1 KOH/gr because the RMA crosslinking reaction is base catalyzed and acid components interfere with the base catalyst C and the acid base reaction between catalyst C and A and optionally D. The RMA crosslinkable resin is preferably prepared in a process comprising a) providing a resin comprising fatty acid esters having an acid value below 5, preferably below 4, 3, 2 and most preferably below 1 KOH/gr and b) adding reactive component A preferably having at least one ester group and more preferably a malonate ester and 3) reacting at least a part of the reactive component A with the resin comprising fatty acid esters. This reaction is preferably a transesterification reaction.

The RMA crosslinkable fatty resin comprising a reactive component A, preferably predominantly a malonate or acetoacetate, most preferably malonate, or comprising a reactive component B preferably an acryloyl, or both reactive components A or B is characterised in view of use in RMA crosslinkable compositions having easy to clean properties by a) Molecular weight Mw (weight average) is between 1000-20000, preferably 2000-15000, more preferably 2500-10000
b) Hydroxy value OHV is between 20-300, preferably 20-200 or 50-150, more preferably 75-125, most preferably 80-115
c) Acid value AV is below 5, preferably below 3, 2 or even 1 mg KOH/g,
d) Equivalent weight EQW (per reactive C—H or C=C group) is between 85-1000, preferably 100-750, more preferably 125-500, 150-400 or even 175-300,
e) Functionality defined as number average number of reactive C—H or C=C per molecule is between 2-30, preferably 3-20, more preferably 4-12
f) Glass transition temperature Tg=220-320K, preferably 230-300, more preferably 240-290, most preferably 250-280 (as measured by DSC and referenced below in this description).

The invention also relates to novel RMA crosslinkable fatty resins as herein described that can advantageously be used in RMA crosslinkable compositions for top coatings, in particular according to the inventions those that are ETC, but are also useful for the manufacture of—and as component in—other coating compositions, adhesive compositions or a sealant compositions.

The RMA crosslinkable composition forms the most essential part, i.e. the binder system, of a coating composition. The RMA crosslinkable composition may further comprise additives which are relevant for the crosslinking reaction of the binder system, for example one or more reactivity moderators D, an alcohol as pot life improver, water, reactive solvents that are reactable with reactive component A or B, but also other additives like organic solvents T, sag control agents E, adhesion promotors P, and usual other coating additives like leveling agents, UV stabilisers, pigments, fillers etc. Water may improve pot life but preferably the water content is at most 5 wt %.

The catalyst C is mixed in shortly before the application and therefore the RMA crosslinkable composition is preferably in the form of a kit of parts comprising one or more parts I comprising a base catalyst C for initiating the RMA crosslinking reaction and not both A and B, preferably none of A and B, and one or more parts II not comprising said base catalyst C and comprising other remaining components of the RMA crosslinkable composition.

The invention accordingly also relates to a process for the coating of a substrate surface comprising mixing, shortly before application, the at least one parts I and II of the kit of parts of the RMA crosslinkable composition and applying a layer of the resulting composition on the substrate surface.

The invention also relates to the use of the RMA crosslinkable composition of the invention in coating compositions for application of a top-coating over a conventional sealer layer which is based on one or more resins including epoxy, phenolic, silane, silicone, acrylics, polyurethane, polyurea, polyaspartic resins and their hybrids.

Good results were obtained using the RMA crosslinkable composition for coating a wood floor, in particular a gymnasium floor, a concrete floor, a vinyl floor, terrazo floor, cork floor, phenolic floor or a metal floor. It was further found that the RMA crosslinkable composition can be used for direct coating on concrete floors without a sealer layer, which is very advantageous compared to polyol/isocyanate curing binder systems.

The invention relates in particular to the use of the above described RMA crosslinkable composition wherein the RMA crosslinkable resin comprises fatty acids with C8 to C18 chains with less than 20, 15 or 10 wt % unsaturated fatty acids for the manufacture of a coating composition having easy to clean properties, for use in particular in graffiti resistant coatings and in sanitizable coatings for hospital and toilet walls and floors. The examples show a distinct advantage over known RMA coatings.

RMA crosslinkable composition comprising the resin of the invention are suitable for a variety of coatings applications. These fatty acid modified resins containing reactive components A, in particular malonates, are suitable for use in a variety of coatings applications forming fast-drying, highly cross-linked films that can be formulated for tunable pot-life and good open-time balance.

Floor coatings with significantly longer pot life could be achieved having outstanding chemical resistance and abrasion resistance. This applies in particular to those compositions including effective amounts of reactivity moderating component D, achieving long potlife and short dry to touch time (or working time and service time). The invention further provides RMA compositions for use in floor coating compositions with low VOC, which is advantageous in view of Quality Environment Safety & Health (QESH) requirements, in particular for compositions containing specific reactive solvents which reduce viscosity but not contribute to VOC which is particularly useful for compositions with high particulate filler contents.

The composition presented in this invention is a two-pack (2K) system. A variety of 2K synthetic resin systems are available with the dominant technologies being acid-catalyzed amino cross-linked alkyds, epoxy-amine systems and polyol-polyisocyanate systems. The RMA crosslinkable resin and coating compositions thereof is faster drying plus develops hardness much more quickly than any of these other technologies. Plus, this invention is not sensitive to moisture as are the polyol-isocyanate systems. Pot-life is similar to amino cross-linked alkyds but is much longer than the epoxy-amine or polyol-polyisocyanate systems. This invention retains the good appearance and flow properties of amino crosslinked alkyds, but is formaldehyde-free. Epoxy-amine and polyol-isocyanate technologies both use chemicals that have questionable toxicological profiles: bis-phenol A/F in epoxy resins, amine curing agents, monomeric diisocyanate in polyisocyanate hardeners. Compared to these other 2K systems, this invention has a more favorable toxicological profile.

This invention also has applications in the areas where hygienic environments need to be maintained like hospitals, nursing care, surgery centers, rest rooms etc. Also high traffic public areas like schools, malls, airports need to be constantly cleaned and maintained well. Any coating that protects the surface that has the "easy to clean" characteristics provides advantage for the facility operator and owner. Moreover the coating will resist stains and aesthetically look good. The outstanding easy-to-clean property of the RMA crosslinkable resin of the invention is a very interesting advantage for coating applications in the above mentioned areas.

The invention also relates to method for the preparation of a cured coating having easy to clean properties using a coating composition according to anyone of the previous claims selecting an appropriately high XLD and Tg for a chosen level of OC or an appropriately high OD and XLD for a chosen level of Tg or an appropriately high Tg and OC for a chosen level of XLD wherein appropriate means an ΔE less than 20, preferably less than 15, 10 or even 5.

The invention also relates to a cured coating having easy to clean properties which is crosslinked by RMA crosslinking reaction between at least one crosslinkable component comprising RMA donor and RMA acceptor groups, characterized in that the composition comprises fatty components selected from the group of fatty acids, fatty alcohols, fatty amines, fatty thiols and dimeric fatty acid, a. Said cured coating being characterized by a Oil Content OC in wt % defined as the total weight of fatty components relative to the total solids weight of the crosslinkable composition (the polymer organic material, not including pigments), a high crosslinking density XLD (determined without pigments) determined by DMTA measurement on a cured coating film and a glass transition Tg as determined by DMTA measurement, wherein b. OC is 0-4 wt % and XLD is at least 3.5, preferable at least 4.5, 5.0 or even 5.5 mmoles/g and Tg is at least 330K, preferably at least 340, 350 or even 360K or c. OC is 4-10 wt % and XLD is at least 1.9, preferable at least 2.1, 2.5 or even 3 mmoles/g and Tg is at least 300K, preferably at least 305, or even 310K or d. OC is 10-14 wt % and XLD is at least 1.6, preferable at least 1.7, 1.9, 2.1 or even 2.5 mmoles/g and Tg is at least 300K, preferably at least 305, or even 310K or e. OC is at least 15 wt % and XLD is at least 1.4, preferable at least 1.5, 1.6, 1.7 or even 2 mmoles/g; and Tg is at least 290K, preferably at least 295, 300 or even 305K Alkyd resins have been utilized in the coatings industry for years. They offer excellent applications properties including good flow, appearance and surface wetting to a variety of substrates. This is due to the oil/fatty acid content of alkyds which distinguish them from "oil-free" polyesters. The oils/fatty acids present in alkyds help to reduce the surface tension of the resin while internally plasticizing the resin giving flexibility and resistance to cracking/shrinkage with aging of the coating film.

The fatty acids and oils available for use in alkyds allows selectivity with regards to properties and functionality of the finished polymer. Oils and fatty acids with a higher level of unsaturation (e.g., linseed, tung) generally give better oxidative cure owing to higher levels of linoleic and linolenic acids. This unsaturation can also act as a reactive moiety in radiation curing additionally.

Oils/fatty acids with a higher level of conjugated unsaturation (e.g., dehydrated castor oil) will offer an even higher level of oxidative cure and better reactivity in radiation curing since the conjugation allows resonance stabilization of radicals creating during oxidation and radiation curing. So, the type of oil/fatty acid allows the formulator selectivity in terms of drying and curing properties.

Oils/fatty acids with lower levels of unsaturation, the so-called semi-drying oils (e.g. soybean oil, tall oil, sunflower oil) can still cure oxidatively and via radiation curing but at a lower level. This allows the formulator to incorporate harder segments and balance oxidative properties and radiation curing properties while still maintaining an open film surface. This can be advantageous for good solvent release Highly saturated oils/fatty acids (e.g. coconut oil, palm kernel oil, tallow) allow the formulator to utilize the good properties that oils impart in terms of flexibility and good film flow/appearance with a lower level yellowing upon aging of the coating. Plus, post-cure via oxidative cure can be reduced or eliminated with highly saturated oils/fatty acids which is desirable since in some instances this can lead to cracking and delamination. This is particularly important on more dynamic substrates such as wood. Functional oils such as castor (hydroxyl), vernonia (epoxy, naturally occurring), and epoxidized soybean oil (industrially produced) allow the formulator to build various crosslinking and dual-cure moieties into the alkyd polymer.

Reference is made to EP2556108 and EP2764035 for detailed description of components in the RMA crosslinkable composition A, B C or D, their preparation, the amounts used in the RMA crosslinkable composition as well as for measurement methods and definitions and the description thereof is hereby incorporated by reference and applicable unless described otherwise herein. Most important features are described below in summary.

It is preferred that reactive component A is malonate or acetoacetate and reactive component B is acryloyl. It is preferred that the one or more reactive components A in the crosslinkable component predominantly comprise one type of reactive components, predominantly meaning preferably more than 50, 75, 90 and most preferably 100% of the C—H reactive groups in crosslinkable component A are from one type of reactive component A, preferably from malonate or acetoacetate and most preferably consisting predominantly of malonate and acetoacetate or acetylacetone as the remainder component A. The above similarly applies to component B; so it is preferred that the one or more reactive components B in the crosslinkable component predominantly comprise one type of reactive components, predominantly meaning preferably more than 50, 75, 90 and most preferably 100% of the C=C reactive groups in crosslinkable component B are from one type of reactive component B. The most preferred reactive component B is an acryloyl.

The reactive components A and B are preferably build into a polymer chain or pending or terminal pending on a polymer chain. The RMA crosslinkable resin of the invention is one of the crosslinkable components comprising reactive component A. Optionally other crosslinkable components comprising reactive component A can be present. Preferably, the one or more other crosslinkable components are one or more polymers chosen from the group of polyesters, polyurethanes, polyacrylates, epoxy resins, polyamides and polyvinyl resins which contain components A or B in the main chain, pendant, terminal or combinations thereof. It is noted that molecular preferences herein described in view of easy to clean properties in relation to a fatty RMA crosslinkable component comprising reactive component A (fatty poly-A resin) similarly apply to crosslinkable component comprising reactive component B (fatty poly-B resin), preferably acryloyl. A fatty poly-B resin having predominantly reactive component B, for example a fatty polyacryloyl, can be used to achieve easy to clean properties alone or in combination with a fatty resin with reactive component A. Such fatty poly-B resin can be made in a similar way as fatty poly-A resin by reaction of components B with a fatty polymer as herein described and as know to the skilled person.

The relative amounts of the crosslinkable components in the RMA crosslinkable composition are chosen such that the molar ratio of activated unsaturated reactive group C=C in reactive component B to the activated acidic reactive groups C—H in reactive component A is between 0.5 and 2 and preferably between 0.75-1.5 or 0.8-1.2.

In case a reactive solvent is present having 2 C—H reactive groups (for example malonate) then these are also included in the total amount of C—H in the above ratio as they are crosslinkable components. The total amount of monofunctional material should be low, otherwise it will negatively affect coating properties. Preferably the total amount monofunctional reactive solvent is less than 10, preferably less than 5, 3 or even 2 wt %.

The RMA crosslinkable composition preferably further comprises a reactivity moderator D comprising an X—H group that is also a Michael addition donor reactable with component B under the action of catalyst C, wherein X is C, N, P, O or S or an alcohol with 2 to 12 carbon atoms or both for improving open time and hence working time of application of the floor coating composition on a floor.

The X—H group in component D, preferably an N—H group containing component, has a pKa (defined in aqueous environment) of at least one unit, preferably two units, less than that of the C—H groups in predominant component A, preferably the pKa of the X—H group in component D is lower than 13, preferable lower than 12, more preferably lower than 11, most preferably lower than 10; it is preferably higher than 7, more preferably 8, more preferably higher than 8.5.

The component D preferably comprises a molecule containing the N—H as part of a group —(C=O)—NH—(C=O)—, or of a group —NH—(O=S=O)— or a heterocycle in which the nitrogen of the N—H group is contained in a heterocyclic ring preferably chosen from the group of a substituted or unsubstituted succinimide, glutarimide, hydantoin, triazole, pyrazole, immidazole or uracil, preferably chosen from the group of succinimides, benzotriazoles and triazoles.

The component D is present in an amount between 0.1 and 10 wt %, preferably 0.2 and 7 wt %, 0.2 and 5 wt %, 0.2 and 3 wt %, more preferably 0.5 and 2 wt % relative to the total amount of the crosslinkable components A or B and component D. The component D is present in such amount that the amount of X—H groups in component D is no more than 30 mole %, preferably no more than 20, more preferably no more than 10, most preferably no more than 5 mole % relative to C—H donor groups from component A present in the crosslinkable polymer.

In case components D are present which also comprise reactive groups X—H and can react with B, the molar ratio of activated unsaturated reactive group C=C in reactive component B to the total number of reactive groups C—H in reactive component A and reactive groups X—H in component D is between 0.3 and 3, preferably 0.5-2 and even more preferably 0.75-1.5 or 0.8-1.2.

As described the RMA crosslinkable composition comprises catalyst C which is a base and mixed in only shortly before use of the flooring composition. The catalyst C can be a carbon dioxide blocked strong base catalyst, preferably a quaternary alkyl ammonium bi- or alkylcarbonate (as described in EP2556108). As this catalyst generates $CO_2$ it is preferred for use in coating layers with a thickness up to 500, 400, 300, 200 or 150 micrometer.

For compositions that are to be used in thick layers, in particular in high build and highly filled floor coating layers, the catalyst C is preferably a homogeneously active strong base catalyst, i.e. not of the surface deblocking type as described above. Preferably such catalyst is used in coating layers with a thickness from 150, 200 or 300 up to 2000, 1500, 1000 or 10,000 micrometer. An upper limit in thickness is in practice determined only by cost and intended use.

A suitable homogeneous catalyst C is the reaction product of an epoxide with a tertiary amine as described in EP0326723. The tertiary amine and epoxy components are combined during or shortly before combination of all components. Alternatively either the tertiary amine or epoxy are mixed with the combined components A and B and the remaining constituent of the catalyst is added thereto. The preferred epoxide components contain the epoxide group as glycidyl esters, glycidyl ethers, or epoxidation products of alpha olefins. A preferred tertiary amine is triethylene diamine.

A preferred homogeneous catalyst C is a salt of a basic anion X— from an acidic X—H group containing compound wherein X is N, P, O, S or C, and wherein anion X— is a Michael Addition donor reactable with component B and anion X— is characterized by a pKa(C) of the corresponding acid X—H of more than two units lower than the pKa(A) of the majority component A and being lower than 10.5. Details of this catalyst are described in WO2014166880A1, which is hereby incorporated by reference. This catalysts C is especially useful in applications in which there is no large surface available for allowing $CO_2$ to evaporate such as in the case of thick films applications.

In this case catalyst C is a salt according to formula Cat"1" X", wherein Cat"1" is a non-acidic cation, with no ability to inhibit the crosslinking reaction of components A and B. This implies that, if any protons are associated with the cation, their acidity does not exceed that of the dominant C—H functions in component A, by more than two units, preferably not more than 1 and more preferably not more than 0.5 pKa unit. Examples of useful cations include inorganic cations, preferably alkaline or alkaline earth metal cations, more preferably K+, Na+ and Li+, or organic cations like tetra-alkylammonium and tetra-alkylphosphonium salts, but also cations that do have a proton but are extremely non-acidic, for example protonated species of strongly basic organic bases as e.g. 1,8-Diazabicyclo[5.4.0]undec-7-ene (DBU), 1,5-Diazabicyclo[4.3.0]non-5-ene (DBN) or tetra-methylguanidine. These bases would be able to initiate the crosslinking reaction between components A and B but do not interfere with the reaction (inhibiting) in their protonated form.

In view of the fact that the RMA crosslinking reaction is base catalyzed, acidic components should not be used in the composition such that the acid base reaction between catalyst C and A and optionally D is not interfered. Preferably the composition is free of acidic components.

The RMA composition may comprise one or more organic solvents T required for dissolving certain components or for adjusting the RMA composition to an appropriate handling viscosity (eg for spraying application). Organic solvents for use in RMA crosslinkable compositions are common coating solvents that do not contain acid impurities like alkylacetate (preferably butyl or hexyl acetate), alcohol (preferably C2-C6 alcohol), N alkylpyrrolidine, glycolether, Di-propylene Glycol Methyl Ether, Dipropylene Glycol Methyl Ether, Propylene Glycol Methyl Ether Acetate, ketones etc.

The amount of volatile solvent can be between 0 and 60, 50 or 40 wt % but in view of QESH preferably the composition has a low volatile organic compounds (VOC) content and therefore the amount of volatile organic solvent is preferably less than 30, 20, 15, 10, 5 and most preferably less than 2 or even 1 wt % relative to the total of the crosslinkable components A and B.

Where a low viscosity and a low VOC is required it is preferred that the RMA crosslinkable composition comprises monomeric, dimeric or oligomeric crosslinkable components A or B that can act, instead of volatile organic solvents, as reactive solvents. These can also be compounds A' having only 1 reactive acidic protons (C—H) in activated methylene or methine groups or compounds B' having only 1 reactive unsaturated groups (C=C). The total amount of volatile organic solvent plus reactive solvents is between 0 and 30 wt % and the volatile organic solvent is less than 5 wt % relative to the total weight of the RMA composition.

The RMA crosslinkable composition can be used for different applications including coatings, adhesives, inks, synthetic resin flooring or as a binder in structural composites, but preferably is a coating composition (i.e. a paint) optionally comprising further usual coating additives as may required for the envisaged application.

The Tg and crosslink density (XLD) of the final coating can be tuned based on the crosslinkable components to be used, as will be known to those skilled in the art, so adjustments of either Tg or crosslink density to desired levels should be possible without excessive challenge.

In a first order approximation, the Tg of the final crosslinked coating will be related to the Tg of the original components by a relation such as:

$$Tg_{final} = Tg_{mix} + C^*[link]$$

In which Tgmix is the Tg of the mixture of the unreacted components that will end up as solids in the final coating, that can be estimated from the Tg's of those original components by the Fox equation.

$$\frac{1}{Tg_{final}} = \sum_i \frac{w_i}{Tg_i}$$

With i being the components ending up in the solid coating, wi being the weight fraction, and Tgi being the Tg of the individual component.

[link] is the concentration of new (RMA) links to be formed between molecules, in mmole/g final solids, and C is a constant (the value of which for the RMA systems discussed we estimate at around 27 K·g/mmole).

For liquid materials, this Tg will be determined by DSC, and not by DMTA; in our experience there is only a limited offset between the values as determined by DSC at heating rates of 10 K/min, and the described DMTA method.

The crosslink density XLD is a function of the concentration of links being formed between the crosslinkable components in the materials (tied to the equivalent weights), and their functionality (number of reacting functional groups per molecule), as will be known to those skilled in the art.

In a first order approximation, the crosslink density can be estimated to scale as:

$$XLD = \frac{\sum_i (F_i - 2)}{\text{total mass of organic solids ending up in the film}}$$

With i being all the molecules in the composition that will have reacted at least once; and Fi being the number of links formed with other molecules. This number is not necessarily equal to the maximum amount of reactive moieties, as there may be only a fraction of those reacting under incomplete conversion or off-stoichiometric conditions; in that case, a statistical expectation value can be used for Fi. Using such relations, persons skilled in the art will know how to choose the crosslinkable components in the formulation to tune the final Tg and XLD independently to higher of lower values.

EXAMPLES

The following is a description of certain embodiments of the invention, given by way of example only.

The examples relate to compositions comprising a RMA crosslinkable alkyd resin and a carbondioxide blocked base catalyst which is a salt of a quaternary ammonium and an alkylsubstituted carbonate. Table 1 shows the catalyst compositions.

Several malonated alkyds were synthesized as described in the examples 1-5 below. In Ex 1, the fatty acid was coconut fatty acid and reactive component A was malonate and introduced by transesterification of dimethyl malonate. This resin is mainly based on saturated fatty acids with low yellowing tendency. In Ex 5 the fatty acids were coconut fatty acid and epoxidized soybean methyl ester and reactive component A was dimethyl malonate.

The components B of the RMA crosslinkable composition are TMPTA or DiTMPTA, which were mixed in the formulation as a pre-mix with the pigment paste or separately or both. Table 2 lists the components of the coating compositions.

Example 1: Malonated Alkyd 1 (MA1)

A three-liter, four-necked reaction flask equipped with a condenser, agitator, heating mantle, sampling tube, thermocouple attached to a thermowatch and toluene-primed Dean-Stark trap was charged with 349.91 parts coconut fatty acid, 395.47 parts trimethylolpropane, 62.73 parts pentaerythritol, 100.10 parts of phthalic anhydride, 93.60 parts of Adipic acid and 0.94 parts of dibutyltin oxide and sparged with nitrogen at 0.5 standard cubic feet per hour (SCFH) for 15 minutes without agitation followed by 15 minutes with agitation. The reaction mixture was then heated to 450-455° F., discontinuing the nitrogen flow at the onset of distillation. The mixture was held at 450-455° F. for an acid value of <1 adding toluene as needed to maintain a steady reflux. Once the acid value was reached, the mixture was cooled to 180° F. under a nitrogen blanket. 742.89 parts of dimethyl malonate were added to the reaction mixture, a packed column was added to the reactor and the Dean-Stark trap drained. The resin was heated to 330° F. and held until methanol distillation ceased. The nitrogen sparge was then increased to 2.0 SCFH to remove the azeotrope solvent and the resin cooled and filtered. The resulting malonate-functional resin contained 11.4% residual dimethyl malonate and had a Gardner-Holdt viscosity of Z1-Z2 with an acid value of 0.5 and an APHA color of 98. The number average molecular weight was 1490 with a weight average molecular weight was 8530.

Example 5: Malonated Alkyd 5 (MA5)

A four-necked reaction flask equipped with a condenser; agitator; heating mantle; addition funnel; thermocouple attached to a control box (Love control series 32A); and primed Dean-Stark trap with toluene, was charged with 21.4 parts (by weight) of coconut fatty acid, 29.2 parts of trimethylol propane, 11.6 parts of phthalic anhydride, 0.07 parts of dibutyltin oxide, and heated under 0.5 SCFH (standard cubic feet per hour) (0.014 m3 hr-1) nitrogen flow to 165° C. At 165° C., water started to distil azeotropically. The reaction temperature was increased to 230° C. and maintained at such temperature until an acid value <1.0 was attained. The alkyd was cooled to 110° C. To this resin, 30.9 parts of dimethyl malonate was added and the temperature was increased to 180° C. Minimum amount of toluene was added to distil methanol azeotropically. At 150° C., methanol started to distil out. The reaction temperature was kept at 180° C. to collect all the methanol. Once the ethanol stop coming, the reaction was cooled to 110° C. To this resin 20.2 parts of methyl epoxy soyate is added. The temperature increased to 180° C. Methanol started to distill out due to the transesterification of methyl ester at the chain end. The reaction was held at 180° C. to distil out all methanol. The nitrogen flow was increased to 2 SCFH (0.057 m3 hr-1) to remove all the toluene while cooling. The epoxy functional malonated alkyd was filtered and stored. The resulting resin had 98% non-volatile material (NVM); density 9.40 lb/gallon, Gardener-Holdt viscosity of Z5-Z6, an acid value of 0.42; a number average molecular weight (Mn) of 2500; a weight average molecular weight (Mw) of 8500; and a polydispersity of 3.4.

Example A: Preparation of Catalysts 1-3

The catalysts 1 and 2 are carbondioxide blocked tetrabutylammonium hydroxide catalysts and were prepared as described in EP2556108 (catalyst C5). The composition is listed in Table 1:

| Component | Catalyst 1 | Catalyst 2 |
|---|---|---|
| Aqueous TBAH (55%) | 44.60 | 0 |
| TBAH (40%) in Methanol | 0 | 80 |
| DI Water | 4.90 | 0 |
| Diethylcarbonate | 20.10 | 0 |
| Dimethylcarbonate | 0 | 17.2 |
| n-propanol | 30.40 | 0 |
| Methanol | 0 | 13 |

Preparation of Catalyst 3

Catalyst 3 is a homogeneous base catalyst according to WO2014166880A1. A magnetic stirrer was put into a flask containing 74.26 g of ethanol. With gentle mixing, 17.49 g of benzotriazole was added and then 8.25 g of KOH was slowly added. The solution was warmed to 49° C. and mixed for two hours to make KBZT catalyst (Catalyst 3). The base concentration was determined by titration to be 1.324 meq/g.

Coating Formulations were prepared from the components mentioned in Table 2 by mixing the components and pre-dissolved components as indicated. The coating formulations do not contain catalyst yet. This is added later. The usual coating additives not explicitly identified and described are well known commercially available components for levelling, anti-foaming (Foamstar ST-2446), surfactants (Byk 310: 315 1:4), colorants (Chroma Chem 844-9955), surface modifiers (Silmer ACR-D2).

TABLE 2

| Paint Formula | A |
|---|---|
| Malonated Coconut-Alkyd 1 | 41.33 |
| TMP-Triacetoacetate | 7.29 |
| Miramer M300 | 15.42 |
| Miramer M410 | 18.83 |
| Silmer ACR-D2 | 0.12 |
| Subsequently add | |
| Methyl Propyl Ketone | 17.02 |
| TOTAL | 100.0 |

Example B1

100 grams of Formulation A was mixed with 5.82 grams of Catalyst 3 and then applied onto a steel panel. The paint was thoroughly dried after 40 minutes. The potlife of the mixed paint was less than 1 hour. The next day Konig Pendulum Hardness was determined to be greater than 30 seconds. MEK resistance was determined to be greater than 100 double-rubs hence shows good chemical resistance Easy to Clean Tests:

Example A1: 100 g of formulation in example A is mixed with 5.2 g of catalyst 2 and then applied on a Leneta chart and air dried for 72 hours. A dry erase marker was used to draw lines. The lines were then erased with a dry cloth after various time intervals. The results are summarized in Table 3 below.

TABLE 3

Dry erase marker test results on malonated alkyd paint
Dry-Erase Marker on Example A1

| Minutes | Marker Rating |
|---|---|
| 30 | 0 |
| 60 | 0 |
| 100 | 0 |
| 1980 | 0 |

0 = No mark left

A similar test was conducted side by side with a control malonated polyester (MPE1) based coating.

Comparative example formulation CMark1: A clear coating formulation was prepared by mixing 53.8 g of MPE1 with 23.6 g of DTMPTA, 3 g of butylacetate and 3.1 g of n-propanol, and catalyzing it with 3.3 g of catalyst CAT4. Films were applied at a layer thickness of 50-60 mu, and dried for 20 hr at 80° C.

Formulation Mark2: A clear coating formulation was prepared by mixing 52.1 g MA9 and 31.2 g of DTMPTA and catalyzing it with catalyst CAT4 at a level of 50 ueq/g solids. Films were applied at a layer thickness of 50-60 mu, and dried for 20 hr at 80° C.

| | Marker test | | | | | |
|---|---|---|---|---|---|---|
| | Board marker | | | | Permanent marker | |
| | 1 hour | 36 hours | 132 hours | 240 hours | 1 hour | 36 hours |
| White Board | 1 | 1 | 3 | 4 | 20 | 16 |
| CMark1 | 1 | 1 | 1 | 1 | 16 | 20 |
| Mark2 | 1 | 1 | 1 | 1 | 10 | 8 |
| | 1 hour | 48 hours | 165 hours | 240 hours | 1 hour | 48 hours |

Time indicated is the time after applying the marker ink. Lower numbers indicate a higher ease of cleaning. It can be seen that the RMA coating based on MA9 performs best.

In a second test two different pigments were placed on the coatings made using malonated alkyd MA9 and malonated polyester MPE1 as comparative. After removal of the pigments the amount remaining on the coating is measured (see further description further below). This is also an indicator of the "easy to clean" characteristics, lower values indicating a better performance.

TABLE 5 easy to clean test using 2 different pigments
Material Remaining

| Applied coating | CMark1 | Mark2 |
|---|---|---|
| Carbon Black | 7.7% | 3.7% |
| Iron Oxide | 42.9% | 7.3% |

From the above data it is clear that the malonated alkyd MA9 based formulation had outstanding "easy to clean" characteristics.

A further set of examples is given below. Abbreviations of constituting monomers in the following examples are given in Table 1.

TABLE 1

Abbreviations

| | |
|---|---|
| DEM | Diethyl malonate |
| DMIPA | Dimethyl isophthalate |
| HHPA | Hexahydrophthalic anhydride |
| LME | Lauric acid methyl ester |
| M300 | Trimethylolpropane triacrylate (Miwon) |
| M370 | Tris(2-hydroxy ethyl)isocyanurate Triacrylate (Miwon) |
| M4004 | Pentaerythritol (EO)n Tetraacrylate (Miwon) |
| M410 | Ditrimethylolpropane tetraacrylate (Miwon) |
| MO | methyl oleate |
| NPG | Neopentylglycol |
| OME | Octanoic acid methyl ester |
| TMPAA | Trimethylolpropane triacetoacetate (Lonzamon AATMP) |

Malonated Polyester MPE1

MPE1 is prepared as follows: Into a reactor provided with a distilling column filed with Raschig rings were brought 382 g of neopentyl glycol, 262.8 g of hexahydrophthalic anhydride and 0.2 g of butyl stannoic acid. The mixture was polymerised at 240° C. under nitrogen to an acid value of 0.2 mg KOH/g. The mixture was cooled down to 130° C. and 355 g of diethylmalonate was added. The reaction mixture was heated to 170° C. and ethanol was removed under reduced pressure. The resin was further cooled and diluted with butyl acetate to 85% solids, to yield a material with OH value 16 mg KOH/g, GPC Mn 1750, and a malonate equivalent weight of 350 (active C—H EQW 175).

resulting alkyd had a hydroxyl value of 73 mg KOH/g; a malonate equivalent weight of 338 (C—H EQW 169); an oil length of 10%; a GPC Mn of 838; an Mw of 1267.

General Procedure for Preparation of Malonated Alkyds from 11 to 14 (MA 11-14)

Typical procedure for the preparation of malonated alkyd was as follows. A four-necked reaction flask equipped with a condenser; agitator; heating mantle; Hempel packed column; and a thermocouple attached to a control box was charged with 295.7 parts of methyl laurate, 455.5 parts of neopentyl glycol, 147.3 parts of dimethyl isophthalate, 0.27 parts of n-butyltin hydroxide oxide, and heated to 170° C. under a nitrogen flow. At 170° C., methanol started to distil out. The reaction temperature was increased to 200-220° C. and maintained at such temperature until methanol stopped coming. The alkyd was cooled to <120° C. under a nitrogen flow, the packed column was removed and 447.1 parts of diethyl malonate was added. The reaction temperature was increased to 150° C. at which the ethanol started to distil out. The temperature was increased to 170° C. and maintained at such temperature until the ethanol stopped coming. The mixture was brought under vacuum at 170° C. and maintained as such to collect all the residual ethanol. Once the ethanol stopped coming, the reaction was cooled at room temperature and the resulting resin was stored in a closed container.

Malonated alkyd compositions and properties of examples 10 through 14 are given in Table 2

TABLE 2

Malonated alkyd compositions and properties

| Alkyd codes | Parts of constituting monomers | | | | | | | Mn | Mw | D | OH value (KOH/g) | Oil length | CH-EQW* |
|---|---|---|---|---|---|---|---|---|---|---|---|---|---|
| | LME | HHPA | OME | MO | NPG | DMIPA | DEM | | | | | | |
| MA10 | 8 | 16 | — | — | 39 | — | 37 | 838 | 1267 | 1.5 | 73 | 10 | 169.0 |
| MA11 | 22 | — | — | — | 34 | 11 | 33 | 1029 | 1544 | 1.5 | 31 | 29 | 180.5 |
| MA12 | 21 | — | — | — | 32 | 10 | 37 | 1070 | 1607 | 1.5 | 17 | 28 | 165.0 |
| MA13 | — | — | 16 | — | 34 | 11 | 39 | 1061 | 1751 | 1.7 | 38 | 23 | 159.6 |
| MA14 | — | — | — | 25 | 31 | 9 | 35 | 1100 | 1760 | 1.6 | 31 | 34 | 185.4 |

*active CH- Equivalent Weights

Malonated Alkyd 9 (MA9)

MA9 is a malonated alkyd using coconut oil as the oil component, an oil length of 30%, an OH value of 108 mg KOH/g, a GPC Mn of 1800 and a Mw of 4350. The malonate equivalent weight of this material is 360 (active C—H equivalent weight 185).

Malonated Alkyd 10 (MA10)

A four-necked reaction flask equipped with a condenser; agitator; heating mantle; Hempel packed column; and a thermocouple attached to a control box was charged with 104.0 parts of methyl laurate, 505.5 parts of neopentyl glycol, 207.4 parts of hexahydrophthalic anhydride, 0.28 parts of n-butyltin hydroxide oxide, and heated under a nitrogen flow to 170° C. At 170° C., water started to distil. The reaction temperature was increased to 220° C. and maintained at such temperature until an acid value <1.0 was attained. The alkyd was cooled to 120° C. under a nitrogen flow, the packed column was removed and 479.7 parts of diethyl malonate was added. The reaction temperature was increased to 150° C. at which the ethanol started to distil out. The temperature was increased to 170° C. and maintained at such temperature until the ethanol stopped coming. The mixture was brought under vacuum at 170° C. and maintained as such to collect all the residual ethanol. The Malonated Alkyd 15 (MA15)

A four-necked reaction flask equipped with a condenser; agitator; heating mantle; and a thermocouple attached to a control box (Love control series 32A) was charged with 415.8 parts of lauryl alcohol, 178.8 parts of diethyl malonate, 0.11 parts of n-butyltin hydroxide oxide, and heated to 150° C. under a nitrogen flow. At 150° C., ethanol started to distil out. The reaction was increased to 170° C. and maintained at such temperature until the ethanol stopped coming. The mixture was brought under vacuum at 170° C. and maintained as such to collect all the residual ethanol. The resulting resin had a hydroxyl value of 36; a CH-EQW of 227; a GPC Mn of 519; a GPC Mw of 569.

Malonated Polyester 16 (MP 16)

A four-necked reaction flask equipped with a condenser; agitator; heating mantle; and a thermocouple attached to a control box (Love control series 32A) was charged with 185.1 parts of neopentyl glycol, 314.9 parts of diethyl malonate, 0.1 parts of n-butyltin hydroxide oxide, and heated to 150° C. under a nitrogen flow. At 150° C., ethanol started to distil out. The reaction was increased to 170° C. and maintained at such temperature until the ethanol stopped coming. The mixture was brought under vacuum at 170° C.

and maintained as such to collect all the residual ethanol. The resulting resin had a hydroxyl value of 45.5; a CH-EQW of 89; a GPC Mn of 1350; an Mw of 2407; and a polydispersity of 1.8.

Alkyd Resin 17 (A17)

A four-necked reaction flask equipped with a condenser; agitator; heating mantle; and a thermocouple attached to a control box (Love control series 32A) was charged with 166.1 parts of neopentyl glycol, 683.6 parts of methyl laurate, 0.20 parts of n-butyltin hydroxide oxide, and heated to 170° C. under a nitrogen flow. At 170° C., methanol started to distil out. The reaction temperature was increased to 200° C. and maintained at such temperature until methanol stopped coming. The mixture was brought under vacuum at 170° C. and maintained as such to collect all the residual ethanol. The resulting alkyd resin had a hydroxyl value of 41; an oil length of 89%; a Mn of 461; an Mw of 542; and a polydispersity of 1.2.

Mercaptane-Modified Polyfunctional Acrylate (SH-M410)

A single-neck reaction flask equipped with a magnetic bar coated with Teflon and a magnetic stir plate was charged with 20.0 parts of M410, 2.86 parts of triethylamine, and agitated at ambient temperature. Once the mixture was homogeneous, 8.64 parts of dodecanethiol, was added dropwise in the reaction flask. NMR was used to determine the percentage of reacted double bonds of M410. This was 25%. The resulting mercaptane-modified polyfunctional acrylate had an oil length of 30% and an Mn of 667.

TABLE 3

The catalyst 4 (CAT4) composition (base content 0.928 mmole/g)

| Component | Catalyst C |
| --- | --- |
| Aqueous TBAH (55%) | 100 |
| Diethylcarbonate | 45.1 |
| n-propanol | 181 |

General Procedure for Preparing and Applying Coating Formulations

The donor and acceptor components, any additives, and the thinning solvents were transferred to a flask and mixed. After obtaining a homogeneous mixture the stated amount of catalyst 4 was added. The composition of the catalyst 4 is listed in Table 3.

Coating formulations were drawn down on a glass panel (175×100×3 mm), to obtain a dry layer thickness of 50-60 micron. In most cases, curing was done at 80° C. for 24 h, to allow for maximum conversion and avoid film inhomogeneity through solvent entrapment. The easy-to-clean properties were tested at room temperature.

Coatings formulation were prepared from the components mentioned in Table 4.

TABLE 4

RMA formulations

| Component | A1 | A2 | A3 | A4 | A5 | A6 | A7 |
| --- | --- | --- | --- | --- | --- | --- | --- |
| grams MA9 | 0.0 | 0.0 | 14.7 | 0.0 | 0.0 | 0.0 | 29.3 |
| grams MPE1 | 0.0 | 0.0 | 26.6 | 35.8 | 0.0 | 0.0 | 12.4 |
| grams TMPAA | 0.0 | 29.3 | 8.9 | 4.7 | 25.9 | 24.0 | 5.1 |
| grams MP16 | 35.3 | 0.0 | 0.0 | 0.0 | 0.0 | 0.0 | 0.0 |
| grams MA15 | 0.0 | 0.0 | 0.0 | 0.0 | 0.0 | 9.6 | 0.0 |
| grams MA10 | 0.0 | 0.0 | 0.0 | 0.0 | 0.0 | 0.0 | 0.0 |
| grams MA11 | 0.0 | 0.0 | 0.0 | 0.0 | 0.0 | 0.0 | 0.0 |
| grams A17 | 0.0 | 0.0 | 0.0 | 8.6 | 8.6 | 0.0 | 0.0 |
| grams MA12 | 0.0 | 0.0 | 0.0 | 0.0 | 0.0 | 0.0 | 0.0 |
| grams MA13 | 0.0 | 0.0 | 0.0 | 0.0 | 0.0 | 0.0 | 0.0 |
| grams MA14 | 0.0 | 0.0 | 0.0 | 0.0 | 0.0 | 0.0 | 0.0 |
| Pre-dissolve: | | | | | | | |
| grams 1,2,4-Triazole | 0.0 | 0.0 | 0.0 | 0.0 | 0.0 | 0.0 | 0.0 |
| grams Succinimide | 0.0 | 0.0 | 0.0 | 0.0 | 0.0 | 0.0 | 0.0 |
| n-propanol | 0.0 | 0.0 | 0.0 | 0.0 | 0.0 | 0.0 | 0.0 |
| Subsequently add and mix: | | | | | | | |
| grams M410 | 41.6 | 47.6 | 30.8 | 0.0 | 42.0 | 43.4 | 32.0 |
| grams M4004 | 0.0 | 0.0 | 0.0 | 33.6 | 0.0 | 0.0 | 0.0 |
| grams M300 | 0.0 | 0.0 | 0.0 | 0.0 | 0.0 | 0.0 | 0.0 |
| grams M370 | 0.0 | 0.0 | 0.0 | 0.0 | 0.0 | 0.0 | 0.0 |
| grams SH-M410 | 0.0 | 0.0 | 0.0 | 0.0 | 0.0 | 0.0 | 0.0 |
| grams BuAc | 2.1 | 2.1 | 1.7 | 1.5 | 2.2 | 2.1 | 1.9 |
| grams n-propanol | 16.8 | 16.8 | 13.2 | 12.1 | 17.7 | 16.8 | 15.1 |
| Subsequently add and mix: | | | | | | | |
| grams Catalyst 4 | 4.1 | 4.2 | 4.1 | 3.7 | 3.7 | 4.1 | 4.1 |

TABLE 5

RMA formulations

| Component | A8 | A9 | A10 | A11 | A12 | A13 | A14 |
| --- | --- | --- | --- | --- | --- | --- | --- |
| grams MA-9 | 7.3 | 32.5 | 0.0 | 38.6 | 43.0 | 44.4 | 44.3 |
| grams MPE1 | 12.7 | 0.0 | 0.0 | 0.0 | 0.0 | 0.0 | 0.0 |
| grams TMPAA | 4.3 | 0.8 | 0.0 | 5.8 | 6.4 | 1.8 | 0.0 |
| grams MP16 | 0.0 | 9.4 | 0.0 | 0.0 | 0.0 | 0.0 | 0.0 |
| grams MA15 | 0.0 | 0.0 | 0.0 | 0.0 | 0.0 | 0.0 | 0.0 |
| grams MA10 | 0.0 | 0.0 | 24.1 | 0.0 | 0.0 | 0.0 | 0.0 |
| grams MA11 | 23.4 | 0.0 | 24.1 | 0.0 | 0.0 | 0.0 | 0.0 |
| grams A17 | 0.0 | 0.0 | 0.0 | 0.0 | 0.0 | 0.0 | 0.0 |
| grams MA12 | 0.0 | 0.0 | 0.0 | 0.0 | 0.0 | 0.0 | 0.0 |
| grams MA13 | 0.0 | 0.0 | 0.0 | 0.0 | 0.0 | 0.0 | 0.0 |
| grams MA14 | 0.0 | 0.0 | 0.0 | 0.0 | 0.0 | 0.0 | 0.0 |
| Pre-dissolve: | | | | | | | |
| grams 1,2,4-Triazole | 0.0 | 0.0 | 0.0 | 0.0 | 0.0 | 0.0 | 0.0 |
| grams Succinimide | 0.0 | 0.0 | 0.0 | 0.0 | 0.0 | 0.0 | 0.0 |
| n-propanol | 0.0 | 0.0 | 0.0 | 0.0 | 0.0 | 0.0 | 0.0 |
| Subsequently add and mix: | | | | | | | |
| grams M410 | 31.1 | 34.2 | 28.8 | 32.5 | 30.9 | 0.0 | 0.0 |
| grams M4004 | 0.0 | 0.0 | 0.0 | 0.0 | 0.0 | 34.2 | 32.6 |
| grams M300 | 0.0 | 0.0 | 0.0 | 0.0 | 0.0 | 0.0 | 0.0 |
| grams M370 | 0.0 | 0.0 | 0.0 | 0.0 | 0.0 | 0.0 | 0.0 |
| grams SH-M410 | 0.0 | 0.0 | 0.0 | 0.0 | 0.0 | 0.0 | 0.0 |
| grams BuAc | 1.9 | 2.1 | 2.1 | 2.1 | 1.7 | 9.5 | 2.1 |
| grams n-propanol | 15.0 | 16.8 | 16.8 | 16.8 | 13.7 | 5.7 | 16.8 |
| Subsequently add and mix: | | | | | | | |
| grams Catalyst 4 | 4.2 | 4.1 | 4.1 | 4.1 | 4.3 | 4.3 | 4.2 |

TABLE 6

RMA formulations

| Component | A15 | A16 | A17 | A18 | A19 | A20 | A21 | A22 |
|---|---|---|---|---|---|---|---|---|
| grams MA-9 | 44.4 | 44.6 | 44.6 | 0.0 | 48.3 | 0.0 | 48.4 | 0.0 |
| grams MPE1 | 0.0 | 0.0 | 0.0 | 0.0 | 0.0 | 0.0 | 0.0 | 0.0 |
| grams TMPAA | 0.0 | 0.0 | 0.0 | 0.0 | 1.8 | 3.1 | 0.0 | 0.0 |
| grams MP16 | 0.0 | 0.0 | 0.0 | 0.0 | 0.0 | 0.0 | 0.0 | 0.0 |
| grams MA15 | 0.0 | 0.0 | 0.0 | 0.0 | 0.0 | 0.0 | 0.0 | 0.0 |
| grams MA10 | 0.0 | 0.0 | 0.0 | 0.0 | 0.0 | 0.0 | 0.0 | 0.0 |
| grams MA11 | 0.0 | 0.0 | 0.0 | 0.0 | 0.0 | 46.5 | 0.0 | 48.7 |
| grams A17 | 0.0 | 0.0 | 0.0 | 0.0 | 0.0 | 0.0 | 0.0 | 0.0 |
| grams MA12 | 0.0 | 0.0 | 0.0 | 54.5 | 0.0 | 0.0 | 0.0 | 0.0 |
| grams MA13 | 0.0 | 0.0 | 0.0 | 0.0 | 0.0 | 0.0 | 0.0 | 0.0 |
| grams MA14 | 0.0 | 0.0 | 0.0 | 0.0 | 0.0 | 0.0 | 0.0 | 0.0 |
| Pre-dissolve: | | | | | | | | |
| grams 1,2,4-Triazole | 0.0 | 0.0 | 0.0 | 0.0 | 0.0 | 0.0 | 0.4 | 0.0 |
| grams Succinimide | 0.0 | 0.0 | 0.0 | 0.0 | 0.0 | 0.0 | 1.5 | 0.0 |
| n-propanol | 0.0 | 0.0 | 0.0 | 0.0 | 0.0 | 0.0 | 17.5 | 0.0 |
| Subsequently add and mix: | | | | | | | | |
| grams M410 | 0.0 | 0.0 | 0.0 | 33.9 | 30.2 | 27.4 | 29.0 | 28.3 |
| grams M4004 | 32.6 | 0.0 | 0.0 | 0.0 | 0.0 | 0.0 | 0.0 | 0.0 |
| grams M300 | 0.0 | 0.0 | 0.0 | 0.0 | 0.0 | 0.0 | 0.0 | 0.0 |
| grams M370 | 0.0 | 32.4 | 32.4 | 0.0 | 0.0 | 0.0 | 0.0 | 0.0 |
| grams SH-M410 | 0.0 | 0.0 | 0.0 | 0.0 | 0.0 | 0.0 | 0.0 | 0.0 |
| grams BuAc | 2.1 | 2.1 | 2.1 | 0.7 | 1.7 | 2.0 | 0.0 | 2.1 |
| grams n-propanol | 16.8 | 16.8 | 16.8 | 5.9 | 13.7 | 16.8 | 0.0 | 16.8 |
| Subsequently add and mix: | | | | | | | | |
| grams Catalyst 4 | 4.2 | 4.1 | 4.2 | 5.0 | 4.3 | 4.1 | 3.1 | 4.1 |

TABLE 7

RMA formulations

| Component | A23 | A24 | A25 | A26 | A27 | A28 | A29 | A30 |
|---|---|---|---|---|---|---|---|---|
| grams MA9 | 51.2 | 53.0 | 0.00 | 53.8 | 0.0 | 0.0 | 0.0 | 0.0 |
| grams MPE1 | 0.0 | 0.0 | 0.0 | 0.0 | 0.0 | 0.0 | 58.8 | 57.2 |
| grams MA5 | 0 | 0 | 58.8 | 0 | 0 | 0 | 0 | 0 |
| grams TMPAA | 1.9 | 0.0 | 0.00 | 2.2 | 18.7 | 0.0 | 0.0 | 1.9 |
| grams MP16 | 0.0 | 0.0 | 0.00 | 0.0 | 0.0 | 0.0 | 0.0 | 0.0 |
| grams MA15 | 0.0 | 0.0 | 0.00 | 0.0 | 0.0 | 0.0 | 0.0 | 0.0 |
| grams MA10 | 0.0 | 0.0 | 0.00 | 0.0 | 0.0 | 0.0 | 0.0 | 0.0 |
| grams MA11 | 0.0 | 0.0 | 0.00 | 0.0 | 0.0 | 0.0 | 0.0 | 0.0 |
| grams A17 | 0.0 | 0.0 | 0.00 | 0.0 | 0.0 | 0.0 | 0.0 | 0.0 |
| grams MA12 | 0.0 | 0.0 | 0.00 | 0.0 | 0.0 | 0.0 | 0.0 | 0.0 |
| grams MA13 | 0.0 | 0.0 | 0.00 | 0.0 | 0.0 | 0.0 | 0.0 | 0.0 |
| grams MA14 | 0.0 | 0.0 | 0.00 | 0.0 | 0.0 | 51.1 | 0.0 | 0.0 |
| Pre-dissolve: | | | | | | | | |
| grams 1,2,4-Triazole | 0.0 | 0.4 | 0.00 | 0.0 | 0.0 | 0.0 | 0.0 | 0.0 |
| grams Succinimide | 0.0 | 0.0 | 0.00 | 0.0 | 0.0 | 0.0 | 0.0 | 0.0 |
| n-propanol | 0.0 | 7.1 | 0.00 | 0.0 | 0.0 | 0.0 | 0.0 | 0.0 |
| Subsequently add and mix: | | | | | | | | |
| grams M410 | 0.0 | 0.0 | 29.8 | 0.0 | 0.0 | 29.2 | 0.0 | 29.8 |
| grams M4004 | 0.0 | 0.0 | 0.00 | 0.0 | 0.0 | 0.0 | 0.0 | 0.0 |
| grams M300 | 27.3 | 26.9 | 0.00 | 21.0 | 0.0 | 0.0 | 26.9 | 0.0 |
| grams M370 | 0.0 | 0.0 | 0.00 | 0.0 | 0.0 | 0.0 | 0.0 | 0.0 |
| grams SH-M410 | 0.0 | 0.0 | 0.00 | 0.0 | 58.2 | 0.0 | 0.0 | 0.0 |
| grams BuAc | 5.7 | 8.1 | 0.00 | 2.2 | 2.1 | 1.7 | 1.2 | 0.7 |
| grams n-propanol | 9.6 | 0.0 | 7.9 | 16.8 | 16.9 | 13.6 | 8.9 | 6.1 |
| Subsequently add and mix: | | | | | | | | |
| grams Catalyst 4 | 4.4 | 4.5 | 3.55 | 4.1 | 4.1 | 4.4 | 4.1 | 4.4 |

TABLE 8

| Component | A31 | A32 | A33 | A34 | A35 | A36 |
|---|---|---|---|---|---|---|
| grams MA9 | 0.0 | 0.0 | 23.1 | 0.0 | 0.0 | 0.0 |
| grams MPE1 | 62.5 | 0.0 | 23.9 | 42.9 | 0.0 | 0.0 |
| grams TMPAA | 0.0 | 0.0 | 0.9 | 0.0 | 3.0 | 0.0 |
| grams MP16 | 0.0 | 0.0 | 0.0 | 0.0 | 0.0 | 0.0 |
| grams MA15 | 0.0 | 0.0 | 0.0 | 0.0 | 0.0 | 0.0 |
| grams MA10 | 0.0 | 47.5 | 0.0 | 0.0 | 0.0 | 0.0 |
| grams MA11 | 0.0 | 0.0 | 0.0 | 0.0 | 44.6 | 0.0 |
| grams A17 | 0.0 | 0.0 | 0.0 | 0.0 | 0.0 | 0.0 |
| grams MA12 | 0.0 | 0.0 | 0.0 | 0.0 | 0.0 | 0.0 |
| grams MA13 | 0.0 | 0.0 | 0.0 | 0.0 | 0.0 | 48.2 |
| grams MA14 | 0.0 | 0.0 | 0.0 | 0.0 | 0.0 | 0.0 |
| Pre-dissolve: | | | | | | |
| grams 1,2,4-Triazole | 0.0 | 0.0 | 0.0 | 0.0 | 0.0 | 0.0 |
| grams Succinimide | 0.0 | 0.0 | 0.0 | 0.0 | 0.0 | 0.0 |
| n-propanol | 0.0 | 0.0 | 0.0 | 0.0 | 0.0 | 0.0 |
| Subsequently add and mix: | | | | | | |
| grams M410 | 0.0 | 29.5 | 0.0 | 0.0 | 0.0 | 31.8 |
| grams M4004 | 23.9 | 0.0 | 0.0 | 0.0 | 29.5 | 0.0 |
| grams M300 | 0.0 | 0.0 | 0.0 | 0.0 | 0.0 | 0.0 |
| grams M370 | 0.0 | 0.0 | 32.7 | 0.0 | 0.0 | 0.0 |
| grams SH-M410 | 0.0 | 0.0 | 0.0 | 40.4 | 0.0 | 0.0 |
| grams BuAc | 1.1 | 2.1 | 1.7 | 1.5 | 2.1 | 1.7 |
| grams n-propanol | 8.4 | 16.8 | 13.6 | 11.1 | 16.7 | 13.7 |
| Subsequently add and mix: | | | | | | |
| grams Catalyst 4 | 4.1 | 4.1 | 4.1 | 4.1 | 4.1 | 4.5 |

Procedure for Preparation of 2K Polyurethane Formulation C1

The stated amount of Setalux 1774-SS70 (69% solids, 5% OH, a commercial Nuplex material) and methyl n-amyl ketone (MAK) were transferred to a flask and mixed. After obtaining a homogenous mixture, the stated amount of Setalux 91780 VS-55 (62% solids, 4.5% OH, a commercial Nuplex material), the levelling additive BYK-358N and MAK were added and mixed. Once the mixture was homogeneous, the stated amount of Tolonate HDT-LV (Vencorex) was added in the agitated mixture of acrylic polyols. The resulting mixture was applied on glass panels similarly as in the general procedure for preparation of RMA formulations. Curing was done at 140° C. for 2 hours. This resulted in coating with a dry layer thickness of 52 microns. The easy-to-clean property was tested after cooling of the cured film at room temperature.

TABLE 9

Formulation of 2K polyurethane formulation C1

| Component | C1 |
|---|---|
| Pre-mix: | |
| grams Setalux 1774-SS70 | 48.8 |
| grams MAK | 2.9 |
| Mix and add: | 0.0 |
| grams Setalux 91780 VS-55 | 22.2 |
| Subsequently mix and add: | 0.0 |
| grams BYK-358N | 0.04 |
| grams MAK | 0.9 |
| Subsequently mix and add: | 0.0 |
| grams Tolonate HDT-LV*** | 25.1 |

***Polyisocyanate with 100% non-volatiles and 23% NCO

Results of Easy-to-Clean Testing

TABLE 10

Examples and comparative examples of the easy-to-clean properties of the formulated coating

| Coating | OL | XLD | Tg | ΔE |
|---|---|---|---|---|
| A1a | 0.0 | 5.1 | 364 | 15.4 |
| A2 | 0.0 | 6.4 | 383 | 8.3 |
| A3 | 5.3 | 2.8 | 303 | 5.7 |
| A4 | 9.9 | 2.0 | 307 | 8.0 |
| A5 | 10.0 | 5.5 | 381 | 2.5 |
| A6 | 10.0 | 5.5 | 386 | 5.5 |
| A7 | 10.8 | 3.3 | 337 | 14.3 |
| A8 | 11.3 | 2.7 | 323 | 5.0 |
| A9 | 12.3 | 3.6 | 344 | 2.6 |
| A10 | 12.3 | 1.7 | 315 | 11.9 |
| A11 | 14.6 | 3.5 | 343 | 2.9 |
| A12 | 15.5 | 3.2 | 340 | 2.7 |
| A13 | 16.0 | 2.8 | 303 | 9.9 |
| A14 | 16.7 | 2.7 | 305 | 6.9 |
| A15 | 16.8 | 2.7 | 305 | 7.4 |
| A16 | 16.8 | 1.5 | 342 | 18.2 |
| A17 | 16.8 | 1.5 | 343 | 19.4 |
| A18 | 16.9 | 2.1 | 312 | 6.8 |
| A19 | 17.4 | 2.9 | 330 | 1.3 |
| A20 | 17.5 | 1.7 | 295 | 7.5 |
| A21 | 18.1 | 2.2 | 323 | 3.0 |
| A22 | 18.3 | 1.9 | 312 | 2.9 |
| A23 | 18.5 | 3.1 | 329 | 1.5 |
| A24 | 19.2 | 2.8 | 326 | 1.2 |
| A25 | 19.3 | 2.4 | 322 | 2.0 |
| A26 | 20.3 | 2.2 | 314 | 2.1 |
| A27 | 22.7 | 1.9 | 307 | 6.6 |
| A28 | 21.8 | 2.1 | 315 | 6.2 |
| Comparative examples | | | | |
| A29 | 0.0 | 3.0 | 336 | 28.9 |
| A30 | 0.0 | 2.3 | 333 | 24.0 |
| A31 | 0.0 | 1.2 | 306 | 23.7 |
| A32 | 6.3 | 1.7 | 321 | 31.2 |
| A33 | 8.7 | 1.3 | 337 | 26.2 |
| A34 | 15.8 | 0.9 | 294 | 34.8 |
| A35 | 16.8 | 1.3 | 265 | 27.6 |
| A36 | 13.9 | 2.7 | 330 | 30.7 |
| C1 | 0.0 | 1.3 | 338 | 25.3 |

Table 11 describes the effect of the development of properties upon ambient drying of the compositions of the invention, relative to the 'final' properties as indicated by the force dried compositions (80° C., 24 hrs). It can be seen that the EtC properties improve during initial drying, as the Tg and XLD properties of the coating develop to grow into the preferred ranges.

TABLE 11

Effect of curing methods on easy-to-clean properties

| Coating [a] | OL | XLD | Tg | ΔE |
|---|---|---|---|---|
| A20" [b] | 18.1 | n.a. | n.a. | 31.5 |
| A20' [c] | 18.1 | n.a. | n.a. | 7.8 |
| A20 [d] | 18.1 | 2.2 | 323 | 3.0 |
| A 23" [b] | 19.2 | 2.1 | 297 | 39.9 |
| A 23' [c] | 19.2 | 2.1 | 308 | 12.4 |
| A23 [d] | 19.2 | 2.8 | 326 | 1.2 |

[a] A20"and A20' same formulation of A20; A23"and A23' same formulation of A23
[b] Cured at room temperature for 4 h
[c] Cured at room temperature for >120 h
[d] Post-cured at 80° C. for 24 h General Procedure for Easy-to-Clean Testing Based on Color Measurements Prior to testing, the CIE 1976 (L,a,b) color of coated panels was measured using an AvaSpec-ULS2048 spectrometer at a wavelength of 550 nm. Carbon black pigment was applied to a coated panel as an 8% slurry in water on 6-8 different spots on the coating by using a pipette and left in contact with the coating for 24 hours at room temperature. The panels were turned upside-down; gently tapped on the back, and brushed using a 1-cm wild boar-hair until the resulting deposited dried carbon black stopped coming off. The color (L,a,b) of the tested panels at the position of the stained spots was measured using the spectrometer again.

The CIE color difference ΔE of the coated panel before and after application of the carbon black is defined as:

$$\Delta E = \sqrt{((\Delta L)^2 + (\Delta a)^2 + (\Delta b)^2}$$

where ΔL, Δa and Δb represents the difference in L,a,b values between the reference color and the tested panel. This value is used as a measure of the easy-to-clean properties: the lower the ΔE value, the better these properties are considered to be.

General Procedure for Easy-to-Clean Testing Based on Weight Measurements

Prior to testing, the weight (0.1 mg precision) of coated panels was determined using an analytical balance. Similarly to the color measurement method, carbon black slurry was applied on the coated panels and let dried at room temperature for 24 hours. The panels were carefully weighted to determine the exact amount of the resulting dried carbon black. After weighting, the panels were turned upside-down and gently tapped on the back until the resulting deposited dried carbon black stopped coming off. The panels were weighed again to determine the weight-percent of carbon black picked up by the coating: the lower this value, the better the easy-to-clean properties of the coating. This experiment was run with a carbon black slurry, and also with an iron oxide slurry General Procedure for Easy-to-Clean Testing Based on a Permanent Marker Lines were drawn on the coating using a permanent marker. A paper wipe soaked with isopropyl alcohol was used for cleaning and the number of wipes needed to completely remove one line after a given time was counted (if the line is not fully removed, then the test stops when no more ink is visible on the paper wipe).

General Procedure for Dynamic Mechanical Thermal Analysis

Dynamic Mechanical Thermal Analysis (DMTA) measurements were performed on freestanding films of the materials of interest. Typically, the films applied on glass, used for the easy-to-clean tests, could be removed from the substrate for that purpose. In other cases, similar films were prepared on polypropylene (easy release) substrates. DMTA measurements were done by applying a 0.03% strain, at 11 Hz frequency, from −100 to 200° C., at a heating rate of 5° C./min.

The Tg of the coating was determined from the temperature at which the loss modulus (E″) had a maximum: these are the Tg values used in this application, and referred to in the claims.

The cross-linking density (XLD) was calculated according to rubber elasticity theory by applying the formula:

$$v_z = \frac{E'}{3RT}$$

where the minimum value of the elastic modulus (E') at the rubber plateau was used. This value is in mmole/ml, this can be translated into mmole/g values when using the density of the organic coating: we have assumed this to be 1.2 g/ml for all systems described here.

What is claimed is:

1. A cured top-coating having easy to clean properties which is crosslinked to form a crosslinked network by RMA crosslinking a top-coating layer of an RMA crosslinkable coating composition,
    wherein the RMA crosslinkable coating composition comprises at least one crosslinkable component comprising reactive components A and B, each comprising at least 2 reactive groups, wherein the at least 2 reactive groups of component A are acidic protons C—H in activated methylene or methine groups, and the at least 2 reactive groups of component B are activated unsaturated groups C=C, which at least one crosslinkable component reacted to crosslink by RMA reaction in the presence of a base catalyst (C),
    said RMA crosslinkable coating composition comprises fatty components selected from the group of fatty acids, fatty alcohols, fatty amines, fatty thiols and dimeric fatty acid,
    wherein the fatty components comprise fatty chains containing 10-40 carbons, said cured top-coating having an Oil Content (OC) in wt % defined as the total weight of fatty components relative to the total solids weight of the crosslinkable composition, a crosslinking density (XLD) and a glass transition temperature (Tg) as determined by DMTA measurement on a cured coating film without pigments, wherein:
a) OC is 0-4 wt % and XLD is at least 3.5 mmoles/g and Tg is at least 330K, or
b) OC is 4-10 wt % and XLD is at least 1.9 mmoles/g and Tg is at least 300K, or
c) OC is 10-14 wt % and XLD is at least 1.6 mmoles/g and Tg is at least 300K, or
d) OC is at least 15 wt % and XLD is at least 1.4 mmoles/g and Tg is at least 290K.

2. The cured top-coating according to claim 1, wherein:
a) OC is 0-4 wt % and XLD is at least 4.5 mmoles/g and Tg is at least 340K, or
b) OC is 4-10 wt % and XLD is at least 2.1 mmoles/g and Tg is at least 310K, or
c) OC is 10-14 wt % and XLD is at least 1.9 mmoles/g and Tg is at least 305K, or
d) OC is at least 15 wt % and XLD is at least 1.6 mmoles/g and Tg is at least 305K.

3. The cured top-coating according to claim 2, wherein the cured top-coating has a cleaning parameter value ΔE less than 10 as measured by colour difference measurement before and after applying-and-cleaning of a pigment.

4. The cured top-coating according to claim 1, wherein the cured top-coating has a cleaning parameter value ΔE less than 20 as measured by colour difference measurement before and after applying-and-cleaning of a pigment.

5. The cured top-coating of claim 1, wherein the fatty components in the crosslinked RMA crosslinkable composition are:
a) free unreacted fatty components, or
b) in a fatty adduct that is not covalently bonded in the crosslinked network, or
c) chemically bonded to RMA crosslinkable fatty components, or
d) pendant or in-chain, or
e) combinations thereof.

6. The cured top-coating of claim 1, comprising wherein the fatty components are in fatty adducts that are not covalently bonded in the crosslinked network, wherein the fatty adducts comprise one fatty component reacted to a backbone or two or more fatty components reacted to a polyfunctional backbone.

7. The cured top-coating of claim 6, wherein the fatty components in the fatty adducts comprise a fatty acid reacted to a polyol or fatty alcohol backbone or wherein the fatty component is a fatty amine reacted to a polyacid backbone.

8. The cured top-coating of claim 7, wherein the fatty components comprise a fatty acid reacted to a polyol backbone selected from polyglycerol or neopentylglycol.

9. The cured top-coating of claim 6, wherein the fatty adducts have a molecular weight Mw between 250 and 10000 dalton.

10. The cured top-coating of claim 1, wherein the fatty components are chemically bonded to RMA crosslinkable fatty components.

11. The cured top-coating of claim 10, wherein the fatty components are chemically bonded in an RMA crosslinkable fatty resin containing one or more of the fatty components and at least 2 reactive groups which are acidic protons (C—H) in activated methylene or methine groups, wherein the at least 2 reactive reactive groups C—H are from one or more of the reactive components A which have the structure according to formula 1:

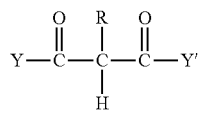

(Formula 1)

wherein R is hydrogen, an alkyl, or aryl, and Y and Y' are identical or different substituent groups selected from, alkyl, aralkyl, aryl, or alkoxy, or wherein the —C(=O)—Y and/or —C(=O)—Y' is replaced by CN or aryl.

12. The cured top-coating of claim 11, wherein the reactive component A in the RMA crosslinkable fatty resin is a malonate, acetoacetate, acetylacetone, acetoacetamide or propionylacetate.

13. The cured top-coating of claim 11, wherein in the RMA crosslinkable fatty resin more than 50% of the reactive groups C—H are from one type of reactive component A.

14. The cured top-coating of claim 11, wherein in the RMA crosslinkable fatty resin more than 50% of the reactive groups C—H are from malonate.

15. The cured top-coating of claim 14, wherein in the RMA crosslinkable fatty resin more than 50% of the reactive groups C—H are from malonate and the remainder of the reactive groups C—H are from acetoacetate or acetylacetone.

16. The cured top-coating of claim 11, wherein the RMA crosslinkable fatty resin is characterised by:
a) a weight average Molecular weight between 1000 and 20000 g/mol,
b) a hydroxy value between 20 and 300 mg KOH/g,
c) an acid value below 5 mg KOH/g,
d) an equivalent weight per C—H group between 85 and 1000 g/mol,
e) a functionality defined as number average number of C—H groups per molecule between 2 and 30, and
f) a glass transition temperature between 220 and 320K as measured by DSC.

17. The cured top-coating of claim 11, wherein the RMA crosslinkable fatty resin is characterised by:
a) a weight average Molecular weight between 2000 and 15000 g/mol,
b) a hydroxy value between 20 and 200 mg KOH/g,
c) an acid value below 3 mg KOH/g,
d) an equivalent weight per C—H group between 100 and 750 g/mol,
e) a functionality defined as number average number of C—H groups per molecule between 3 and 20, and
f) a glass transition temperature Tg between 230 and 0K as measured by DSC.

18. The cured top-coating of claim 11, wherein the RMA crosslinkable resin is a polyol oligomer or polymer modified with fatty acids and the reactive component A or a fatty alcohol or fatty acid oil modified with the reactive component A.

19. The cured top-coating of claim 11, wherein the RMA crosslinkable resin comprises fatty acids comprising a C10 to C18 chain with less than 20 wt % of the fatty acids being unsaturated fatty acids.

20. The cured top-coating of claim 11, wherein the RMA crosslinkable resin comprises fatty acids in an amount of 5 to 60 wt % relative to total weight of the RMA crosslinkable resin and reactive component A in an amount between 1 and 80 wt % relative to total weight of the RMA crosslinkable resin.

21. The cured top-coating of claim 1, applied over a conventional sealer layer which is based on one or more resins including epoxy, phenolic, silane, silicone, acrylics, polyurethane, polyurea or, polyaspartic resins, or is applied over a wood floor, a concrete floor, a vinyl floor, terrazo floor, cork floor, phenolic floor or a metal floor, or is applied directly on concrete floors without a sealer layer, or is applied as graffiti resistant coatings, or is applied as sanitizable coatings for hospital and toilet walls and floors.

* * * * *